United States Patent [19]

Jache

[11] 3,765,942

[45] Oct. 16, 1973

[54] ACCUMULATOR OR BATTERY WITH SULFURIC ACID ELECTROLYTE CONTAINING PHOSPHORIC ACID

[76] Inventor: Otto Jache, Im Thiergarten, Budingen/Oberhessen, Germany

[22] Filed: Nov. 30, 1970

[21] Appl. No.: 93,888

Related U.S. Application Data

[63] Continuation-in-part of Ser. No. 747,974, July 26, 1968, abandoned.

[30] Foreign Application Priority Data

Dec. 1, 1967 Germany .................... A 57 56 121

[52] U.S. Cl. .................................. 136/26, 136/157
[51] Int. Cl. ........................................ H01m 39/04
[58] Field of Search .................. 136/26, 6, 154, 157, 136/17

[56] References Cited
UNITED STATES PATENTS

| | | | |
|---|---|---|---|
| 3,172,782 | 3/1965 | Jache | 136/6 |
| 3,177,096 | 4/1965 | Jache | 136/6 |
| 3,257,237 | 6/1966 | Jache | 136/6 |
| 3,011,007 | 11/1961 | Evers et al. | 136/26 |
| 3,402,077 | 9/1968 | Kida et al. | 136/6 |
| 3,201,281 | 8/1965 | Solomon et al. | 136/6 |
| 3,265,535 | 8/1966 | Sundberg | 136/148 |
| 3,180,760 | 4/1965 | Rauter | 136/6 |
| 3,530,002 | 9/1970 | Little | 136/157 |
| 3,556,860 | 1/1971 | Amlie | 136/157 |

OTHER PUBLICATIONS

Tudor et al., Electrochemical Technology, July – Aug., 1966, p.p. 406–411.

*Primary Examiner*—A. B. Curtis
*Assistant Examiner*—C. F. Lefevour
*Attorney*—Shlesinger, Fitzsimmons & Shlesinger

[57] ABSTRACT

A lead battery or accumulator in which each electrode is wrapped in a web of say, fiber glass, the electrolyte consists of a mixture of sulphuric acid and phosphoric acid, and the electrolyte is made thixotropic by addition of a jell-forming material, such as silicon dioxide with a particle size of 0.01 to 0.02 microns. The web provides pockets which hold the electrolyte, and between adjacent electrodes there are disposed perforated, undulant spacers. The electrode grids are preferably made of a lead-calcium base. Preferably the electrodes are charged while dry, then wrapped in the fiber web, then assembled into the battery housing; then the electrolyte is introduced into the housing; and the housing is ventilated.

3 Claims, 4 Drawing Figures

INVENTOR
OTTO JACHE

BY *B. Eshlesinger*
ATTORNEY

ACCUMULATOR OR BATTERY WITH SULFURIC ACID ELECTROLYTE CONTAINING PHOSPHORIC ACID

This application is a continuation of my copending application Ser. No. 747,974, filed July 26, 1968 now abandoned, for Accumulator or Battery.

The invention relates to a lead battery or accumulator with improved life and improved uniformity in capacity during its cycles of charge and discharge.

Preferably in lead accumulators, whose positive plates consist of a metallic grid and of an essentially active mass of lead suboxide, lead alloy plates are used for the electrode grids, which contain, as the essentially stabilizing part of the alloy, antimony, the antimony content being at most between 5 and 12 percent. Positive plates, with an electrode grid made from such a lead antimony alloy, can contain if occasion arises, as a further stable part of the alloy arsenic, copper, silver, tin, etc. Such batteries have a recognized good life expectancy as regards cycles, that is, as regards continuous successive discharging and charging.

Efforts have been made for quite a long time, however, to eliminate antimony completely in the production of lead accumulators, since antimony is quite expensive in proportion to lead and since with the use of electrode grids containing antimony the self-discharge of the accumulator is considerable. The introduction, though, of lead accumulators whose electrode grids are antimony-free has hitherto suffered from the fact that their positive plates have a very bad life. The active mass of the positive plates loses very quickly its cohesion in the course of the cycling. It loses in increasing amount its capacity to store electrical energy, and to give up again its stored energy, that is, the capacity of the lead accumulator becomes constantly smaller.

It is already known that this loss can be offset by arranging the positive plates in pockets consisting of a fleece of glass fiber or of a web of synthetic material. Thereby, however, only erosion of the positve mass is hindered; the deterioration phenomenon is still not prevented practically.

It is also already known that phosphoric acid may be added to the electrolyte of lead accumulators. Through phosphoric acid addition originally it was desired to prevent the harmful sulphating of accumulators having the lead-antimony alloy electrode grids. Through the addition of the phosphoric acid, moreover, better fixation of the positive mass and thereby a lessening of its spalling off during cycling, as well as a diminution of corrosive action on the grid rack and current conductor can be obtained, whereby all together an improvement in the life of the accumulator can be achieved.

The phosphoric acid has heretofore been supplied in different ways to the electrolyte. For example, it has been added, in a dry state in the form of one of its salts, to the lead oxide used for filling of the capillary plates, or, in fluid form, to the lead paste mixture used for stuffing the positive grid plates.

Another process was to immerse the positive electrodes produced in the usual fashion, before their formation, for a longer time in a strong phosphor-containing sulphuric acid.

It is also possible to add the phosphoric acid directly to the electrolyte used for activating the accumulator.

The hitherto known lead accumulators with a phosphoric-acid-containing electrolyte exhibit, however, an unsatisfactory capacity and an unsatisfactory life in their cycling. In the cycling after an originally brief capacity increase, a heavier capacity decline during the first ten discharges is perceptible. The decrease in capacity is in direct relation to the amount of the phosphoric acid added. With small phosphoric acid additions, the capacity decrease is not so pronounced; while with greater phosphoric acid additions the capacity can decrease up to 50 percent of the initial capacity.

Accumulators are already known which contain an electrolyte with thixotropic characteristics, that is, an electrolyte converted to the thixotropic state by addition of an extremely finely divided insoluble oxide, for example, of silicic acid, or aluminum oxide. The electrodes are wrapped with a fleece or web of glass fibers or another suitable acid resistant fiber. The fleece or web on the electrode holds the electrolyte fast in the vicinity of the plates, and spreads the electrolyte equally over the whole surface of the plates because of its wick-like action, and thereby promotes current passage and diffusion, since the pores of the active mass are filled with freely movable jell-free electrolyte.

The subject matter of the invention is a lead accumulator which is characterized by the combination of the following in themselves known characteristics:

1. The grid of the electrode consists of fine lead, dispersion hardened lead or of an antimony-free lead alloy.
2. Each electrode is wrapped in a fleece or web. The term "web" as hereinafter used is intended to include a fleece.
3. The electrolyte consists of sulphuric acid to which 20 to 35g/l. of phosphoric acid are added and
4. The electrolyte is made thixotropic by addition of a jelling material.

In an accumulator built in accordance with the present invention the capacity does not decrease suddenly during cycling but increases still further and finally does not vary any more.

The invention will now be explained further with reference to the drawings in which.

Figure 1:
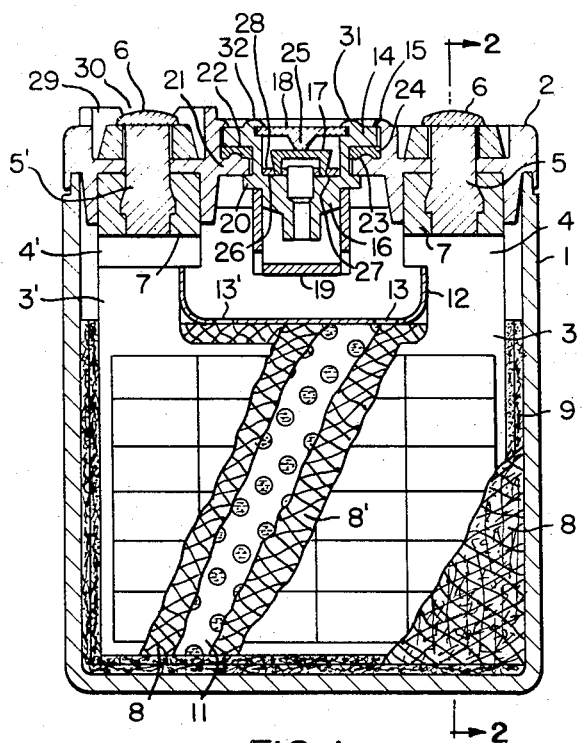
FIG. 1 is a section extending parallel to the plane of the plates of an accumulator made according to the invention, individual parts being broken away for better illustration.

The accumulator illustrated in the drawings consists of a housing 1 and of a cell cover 2 which are cemented or welded together. The negative electrodes 3 and the positive electrodes 3' are fastened together in sets in the usual manner by means of bridges 4 and 4'. The negative terminal post 5 and the positive terminal post 5' extend through the cover 2 and carry on their upper ends contacts 6. For liquid and gas-tight sealing, the posts are mounted in seals 7 in the cover. The individual electrodes 3 and 3' are covered by a web or fiber fleece 8, 8', resulting in pockets for taking up the electrolyte 9, which preferably are open above.

Figure 2:
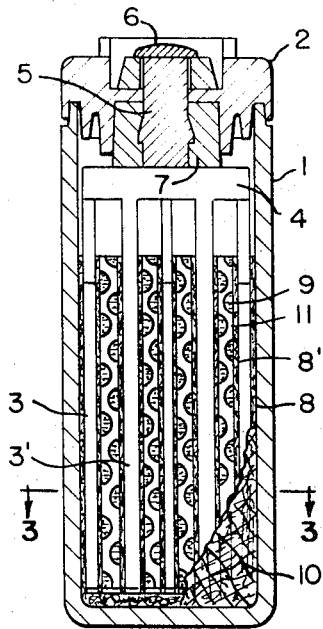
FIG. 2 is a section on the line II—II in FIG. 1.

Preferably, as shown in FIG. 2, the fiber fleeces 8 and 8' are extended about the electrodes 3 and 3' and the space between two neighboring electrodes 3, 3' is covered laterally and on its underside by an additional web 10 for the development of pockets opening only at the top. Between two adjacent electrodes 3 and 3' there is disposed an undulant and perforated spacer 11.

The pockets built up from the fleece or web are covered by a plate 12 which has holes 13, 13' bored through it. In the center of the cover there is a valve block 14 which is secured by a fluted lip 15 against twisting or withdrawal. The valve block comprises a body insert 16, the valve proper formed by an inverted cup-shaped member 17, the cover plate 18 and the protective cage 19.

The valve body has shoulders 20 which in the seating of the valve proper slide under the opposed shoulders 21 provided on the cell cover in the form of a bayonet joint, so that between the sealing surfaces 22 and 23 there is compressed a sealing ring 24. Thus, a sealed closure is provided between the valve insert 14 and the cell cover 2. A boss 25 provided in the cover plate 18 presses the valve body 17 down, whereby the rim 26 of member 17 is sealingly engaged in a ring groove 28 of block 14, such groove being filled with a silicon oil 27.

About the positive pole post 5' with the contact 6 there is built up a protecting ring 29 provided with a slot 30 which with the corresponding opposed contact insures the mounting of the accumulator in its correct position and prevents the poles from being exchanged inadvertently. The cover plate 18 is fixed in the valve block 14 by means of peripheral lugs 31 and of a ring-shaped collar 32 in such a manner that when the valve opens, the excess pressure will be relieved by the escape of gases between the outer periphery of plate 18 and the insert body 14.

The electrolyte consists of sulphuric acid with a density of 1.24 to 1.30, preferably approximately 1.28 at 20°C. To this there are added, per liter, 20 to 35 grams of phosphoric acid; and by addition of a finely divided oxide insoluble in the electrolyte, preferably silicic acid, the electrolyte is converted to a thixotropic state. The most favorable content of phosphoric acid in the electrolyte amounts approximately to 25 g/l.. A phosphoric acid content below 20 g/l. is unsatisfactory, while a phosphoric acid content of over 35 g/l. results in a considerably decrease of the capacity.

For converting the electrolyte to a jell state, preferably finely divided pyrolytically produced silicic acid is used having a particle size of 0.01 to 0.02 micron and a surface of 200m$^2$/g. For jell-building material if occasion arises, other suitable metallic oxides, for example, aluminum oxide, or organic jell builders, which are sufficiently stable in the electrolyte, can be used.

The amount of the added silicic acid depends on the particle size and the surface area and will be approximately from 3 to 10 percent, preferably 6 percent. With use of a silicic acid addition below 3 percent too long stabilizing times are required for the building up of a consistent jell, while with an addition of over 10 percent a premature alteration of the jell can take place.

For covering the electrodes a fiber glass is preferably used, in which the thickness of an individual fiber is approximately 15 microns and the offset between the individual fibers amounts to 150 microns. Thinner glass fibers can also be used up to 10 microns or thicker up to 20 microns. Precautions should be taken, however, to insure that the pore sizes of the fleece, determining the center-to-center offset between individual fibers, is somewhere between 100 and 200 microns.

The grids of the electrodes are made of fine lead, dispersion-hardened lead, or of an antimony-free lead base, preferably of a lead-calcium base produced from 0.08% calcium, the rest lead. Hereinafter, when the term "lead grids" is used, it is meant to cover any and all of these possible types of grids.

It has appeared especially advantageous that the active masses of the electrodes already contain stored at the time of filling of the electrolyte their full electrochemical energy, that is, if in the production of the accumulator dry-charged electrodes are used.

In the following the preparation of the electrolyte will be explained by an example. There are placed in a mixing vessel 90 liters of sulphuric acid; and there are added little by little with continuous stirring 5 kg of very finely divided silicic acid with a surface area of 200 m$^2$/g. Finally 1.6 liters of 85% orthophosphoric acid with a concentration of 1.7 is stirred in. The thus-produced electrolyte is flowed into the cells of the lead accumulator while being continuously stirred until they are filled. It possesses a viscosity of about 1.500 CP.

It has proved especially advantageous, before filling of the electrolyte, first to evacuate the accumulator housing having the sets of electrode plates already in place therein; whereupon the electrolyte is poured in. Caution is to be taken that the electrode plates of the accumulator are brought into contact with the electrolyte as far as possible uniformly and in as brief as possible time. After filling the housing with the electrolyte the housing is exposed to air, so that the pores of the active masses are filled with electrolyte fluid. In this way only the fluid portions of the electrolyte press into the pores, while the silicic acid portions remain in the pockets built out of the glass fiber, and within the pockets, on the basis of the existing fluid, the jell building already sets in. Especially is it advantageous that within the fleece or web lying on the electrodes a higher jell concentration is built up. This results in an improved fixation of the jell in its area.

In order to reduce the loss of water as much as possible to a minimum during the charging of an accumulator built according to the invention, the charging is stopped upon attainment of a cell voltage of at most 2.5 volts.

The accumulator according to the invention is safe in any position, and can be charged and discharged in any suitable position.

Figure 3:
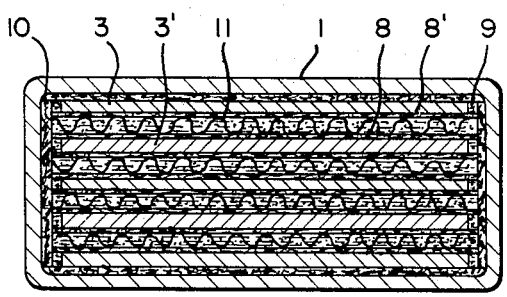
FIG. 3 is a section on the line III—III in FIG. 2.

For proof of the advance achieved by the invention several accumulators with the construction shown in FIGS. 1 to 3 were produced by use of uniform plate materials. An accumulator, which is designated as accumulator A, was filled with an electrolyte which consisted of sulphuric acid converted to the thixotropic state by addition of silicic acid. A further accumulator, which is designated as accumulator C, was filled with an electrolyte which consisted of sulphuric acid converted to the thixotropic state by addition of silicic acid, and to it there was further added, according to the invention, phosphoric acid. A further accumulator was filled with sulphuric acid, to which had been added 6.5 g/l. of phosphoric acid. This accumulator whose electrolyte contained no silicic acid has been designated as accumulator B1. Another accumulator was filled with sulphuric acid which had added to it 26 g/l. of phosphoric acid. This accumulator, whose electrolyte also contained no silicic acid has been designated as accumulator B2.

Figure 4:
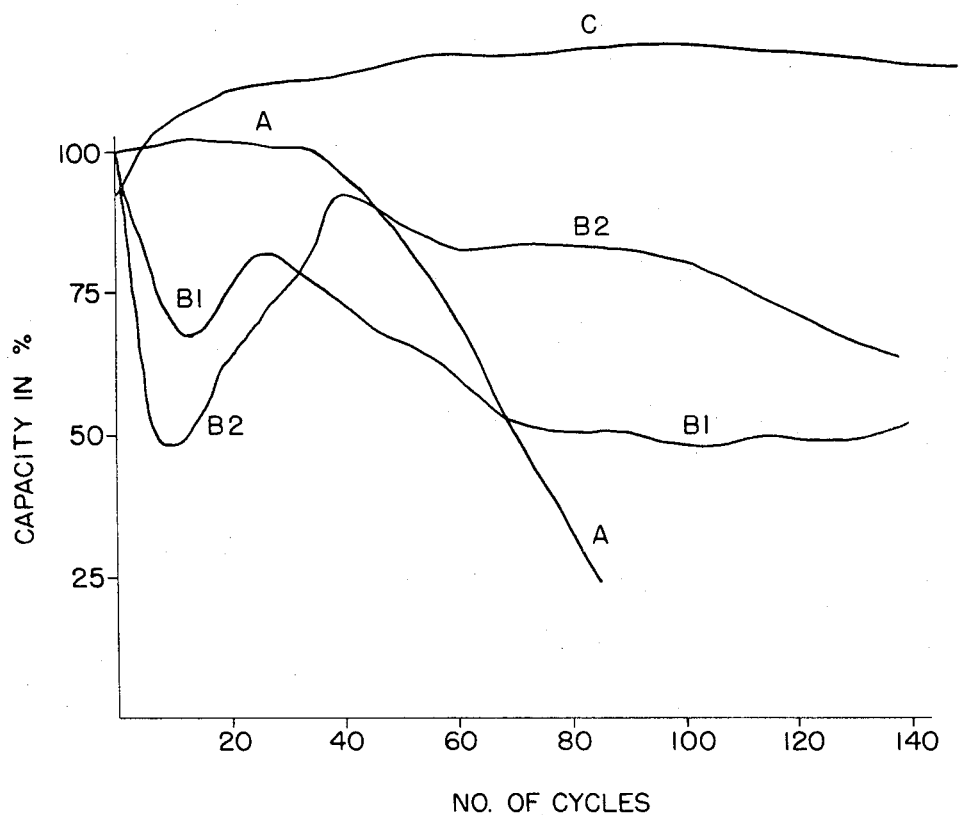
FIG. 4 is a diagrammatic illustration of the capacity of different accumulators in dependence on the number of the cycles.

In FIG. 4 the capacity graphs of the accumulators A, C, B1 and B2 are illustrated in connection with the number of the charging and discharging cycles. From this Fig. it is apparent that the capacity of the accumulator A remains constant up to about 35 cycles, and then decreases very severely. After 85 cycles the accumulator A has practically attained the end of its life. In contrast to this the accumulator C of the invention has at the beginning a lower capacity of about 10 percent. It attains after about 5 cycles the initial capacity of the accumulator A, and in contrast to this, increases then constantly to approximately 115 percent and remains constant finally to over 150 cycles. With accumulators B1 and B2, the capacity first decreases very heavily and then increases to about the 10th cycle. As is apparent from the curve for the accumulator B2 the addition of a higher amount of phosphoric acid causes first a larger capacity decline, then the capacity again increases to a higher value than with use of an electrolyte with a smaller phosphoric acid addition.

In the following table the capacity of the accumulators in ampere hours is given after the first, fifth, tenth, and fifteenth discharges. The accumulators contained a fixed sulphuric acid electrolyte through addition of silicic acid with the phosphoric acid concentrations given in column 1. From the table it is apparent that the range used according to the invention of approximately 20 to 35 g. of phosphoric acid per liter is the most favorable.

TABLE A

| g $H_3PO_4$/l. | Discharges 1 | 5 | 10 | 15 |
|---|---|---|---|---|
| 10 | 7.5 | 7.3 | 7.4 | 7.5 |
| 13.3 | 7.3 | 7.5 | 7.4 | 7.3 |
| 17.7 | 7.2 | 7.2 | 7.5 | 7.8 |
| 23.6 | 6.8 | 7.5 | 7.8 | 8.1 |
| 31.6 | 6.9 | 7.2 | 7.3 | 7.7 |
| 42.4 | 6.2 | 5.2 | 6.2 | 7.0 |
| 56.6 | 5.6 | 5.4 | 6.2 | 6.4 |
| 75.7 | 5.4 | 4.7 | 5.4 | 5.5 |
| 100 | 5.5 | 4.8 | 4.8 | 4.2 |
| 133 | 5.3 | 4.8 | 4.8 | 4.6 |

While the invention has been described in connection with certain specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A lead battery comprising a housing containing spaced electrodes having lead grids free of antimony, an electrolyte comprising a mixture of sulphuric acid and phosphoric acid rendered thixotropic by admixture of jelling material, the quantity of phosphoric acid in the electrolyte, before charging, being 20 to 35g per liter of said electrolyte so that after a lower initial capacity, the capacity of said accumulator increases and then remains substantially constant to over about 150 cycles.

2. A lead battery according to claim 1, wherein the jelling material is silicic acid.

3. A lead battery comprising a housing containing spaced lead electrodes free of antimony, a sulphuric acid electrolyte rendered thixotropic by admixture of a jelling material, and containing a quantity of phosphoric acid, the amount of phosphoric acid in the electrolyte before charging, being 20 to 35g. per liter of said electrolyte so that after a lower initial capacity, the capacity of said accumulator increases and then remains substantially constant to over about 150 cycles.

* * * * *